United States Patent
Zayatz

(10) Patent No.: US 6,831,827 B1
(45) Date of Patent: Dec. 14, 2004

(54) UNIVERSAL FAMILY SPACERS FOR A BATTERY ELECTRICAL PROTECTION DEVICE

(75) Inventor: Robert Zayatz, North Tonawanda, NY (US)

(73) Assignee: Wilson Greatbatch Technologies, Inc., Clarence, NY (US)

(*) Notice: Subject to any disclaimer, the term of this patent is extended or adjusted under 35 U.S.C. 154(b) by 0 days.

(21) Appl. No.: 10/695,563

(22) Filed: Oct. 28, 2003

Related U.S. Application Data
(60) Provisional application No. 60/422,199, filed on Oct. 30, 2002.

(51) Int. Cl.[7] .................................................. H01G 2/10
(52) U.S. Cl. ...................... 361/517; 361/535; 361/301.3
(58) Field of Search ........................... 361/306.1, 306.3, 361/517–520, 535, 538, 760–761, 824; 174/52.1, 52.3; 429/99, 100, 7, 61, 150, 163–165, 170, 171

(56) References Cited

U.S. PATENT DOCUMENTS

| | | |
|---|---|---|
| 4,476,200 A | 10/1984 | Markin et al. |
| 4,487,820 A | 12/1984 | Engelstein et al. |
| 5,057,386 A | 10/1991 | Gordy |
| 5,080,985 A | 1/1992 | Wiacek et al. |
| 5,198,314 A | 3/1993 | Gordy |
| 5,264,303 A | 11/1993 | McCaffery |
| 5,589,293 A | 12/1996 | Pope et al. |
| 5,667,912 A | 9/1997 | Georgopoulos |
| 5,750,283 A | 5/1998 | DePalma et al. |
| 5,770,328 A | 6/1998 | Friedli et al. |
| 5,786,980 A | 7/1998 | Evans |
| 6,205,034 B1 | 3/2001 | Zayatz |
| 6,317,335 B1 | 11/2001 | Zayatz |
| 6,327,137 B1 | 12/2001 | Yamamoto et al. |
| 6,426,867 B1 | 7/2002 | Zayatz |
| 6,437,239 B1 | 8/2002 | Zayatz |
| 6,617,953 B2 | 9/2003 | Zayatz et al. |
| 6,618,273 B2 | 9/2003 | Zayatz et al. |

Primary Examiner—Anthony Dinkins
(74) Attorney, Agent, or Firm—Michael F. Scalise

(57) ABSTRACT

A family of spacers of various sizes for securing a standardized terminating electrical protection device (such as one of the "snap-cap" type) to an electrical energy power source (i.e., a lithium electrochemical cell) is described. The terminating protection device is mounted on a header for an electrochemical cell and contains a circuit board provided with electrical components, such as diodes and fuses. The function of the circuit board is generally to protect the cell from being overcharged or too rapidly discharged, and the like. The spacers are sized to take up the space between the edge of the cell and the edge of the terminating protection device. That way, only variously sized spacers need to be stocked. The spacers are relatively simple to manufacture and inexpensive to stock. For example, the same terminating protection device sized for a "C" sized cell can be used on any larger size cell, for example, a "D" sized cell, by providing a spacer taking up the space between the edge of the larger cell and the terminating protection device.

21 Claims, 4 Drawing Sheets

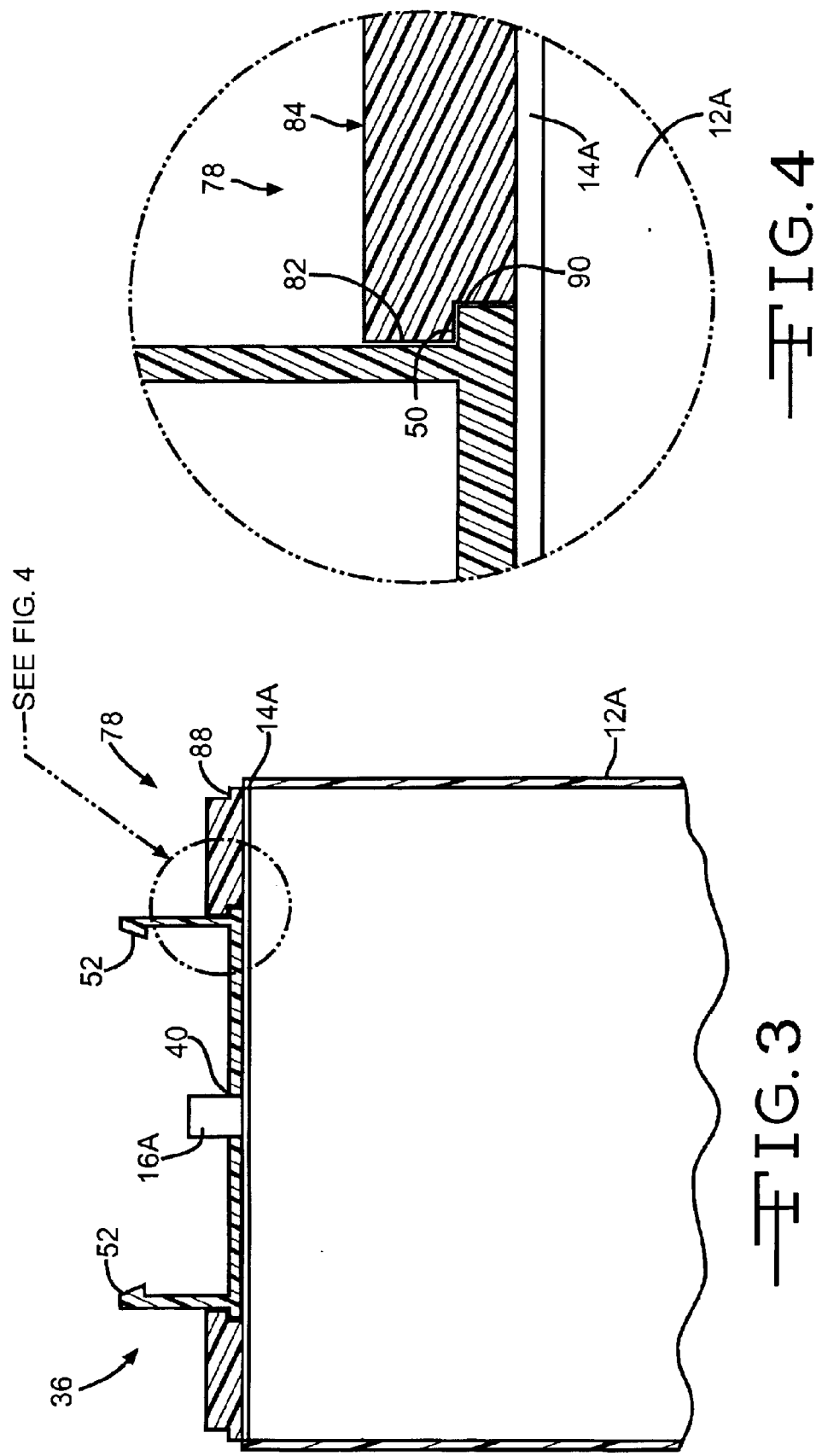

UNIVERSAL FAMILY SPACERS FOR A BATTERY ELECTRICAL PROTECTION DEVICE

CROSS REFERENCE TO RELATED APPLICATION

The present application claims priority from provisional application Ser. No. 60/422,199, filed Oct. 30, 2002.

BACKGROUND OF THE INVENTION

This invention relates generally to devices for protecting an electrical component, and more particularly to a protection device for a circuit board connected to an electrochemical cell or battery.

Protection devices are known for protecting an electrical component, such as a fuse and diode assembly, mounted on an electrochemical cell. According to the present invention, a protection device housing a circuit board mounted on an end of the cell is provided with a cylindrical spacer ring. The spacer ring surrounds and captures the protective device so that a standard shrink-wrap material is suitable for securing the spacer and, consequently, the protective device to the cell. By providing spacers rings in various sizes for variously sized cells, the protection device is standardized. Examples of protection devices, sometimes referred to as snap-cap devices, for an electrical component connected to an electrochemical cell are found in U.S. Pat. Nos. 6,205,034, 6,317,335 6,426,867, and 6,437,239, all to Zayatz, and U.S. Pat. Nos. 6,617,953 and 6,618,273, both to Zayatz et al., the disclosures of which are hereby incorporated by reference.

SUMMARY OF THE INVENTION

The present invention provides a relatively inexpensive family of spacers of various sizes for securing a standardized terminating electrical protection device (such as one of the "snap-cap" type) to an electrical energy power source (i.e., a lithium electrochemical cell). The terminating protection device is mounted on the cell header and contains a circuit board provided with electrical components, such as diodes and fuses. The function of the circuit board is generally to protect the cell from being overcharged or too rapidly discharged, and the like.

Conventional practice is to provide the terminating protection device sized for a particular sized cell. However, this means that separate devices must be manufactured and stocked for each cell size. The present spacers eliminate this stocking problem. The spacers are sized to take up the space between the edge of the cell and the edge of the terminating protection device. That way, only variously sized spacers need to be stocked. The spacers are relatively simple to manufacture and inexpensive to stock. For example, the same terminating protection device sized for a "C" sized cell can be used on a "D" sized cell, and larger, by providing a spacer taking up the space between the edge of the larger cell and the terminating protection device.

These and other aspects and advantages of the present invention will become increasingly more apparent to those skilled in the art by reference to the following description.

BRIEF DESCRIPTION OF THE DRAWINGS

FIG. 3 is a side elevational view of the protective housing 36 shown in FIG. 1 mounted on an oversized cell casing 12A with the aid of a spacer ring 78 according to the present invention.

FIG. 4 is an enlarged view of the indicated area in FIG. 3.

DETAILED DESCRIPTION OF THE INVENTION

Figure 1:
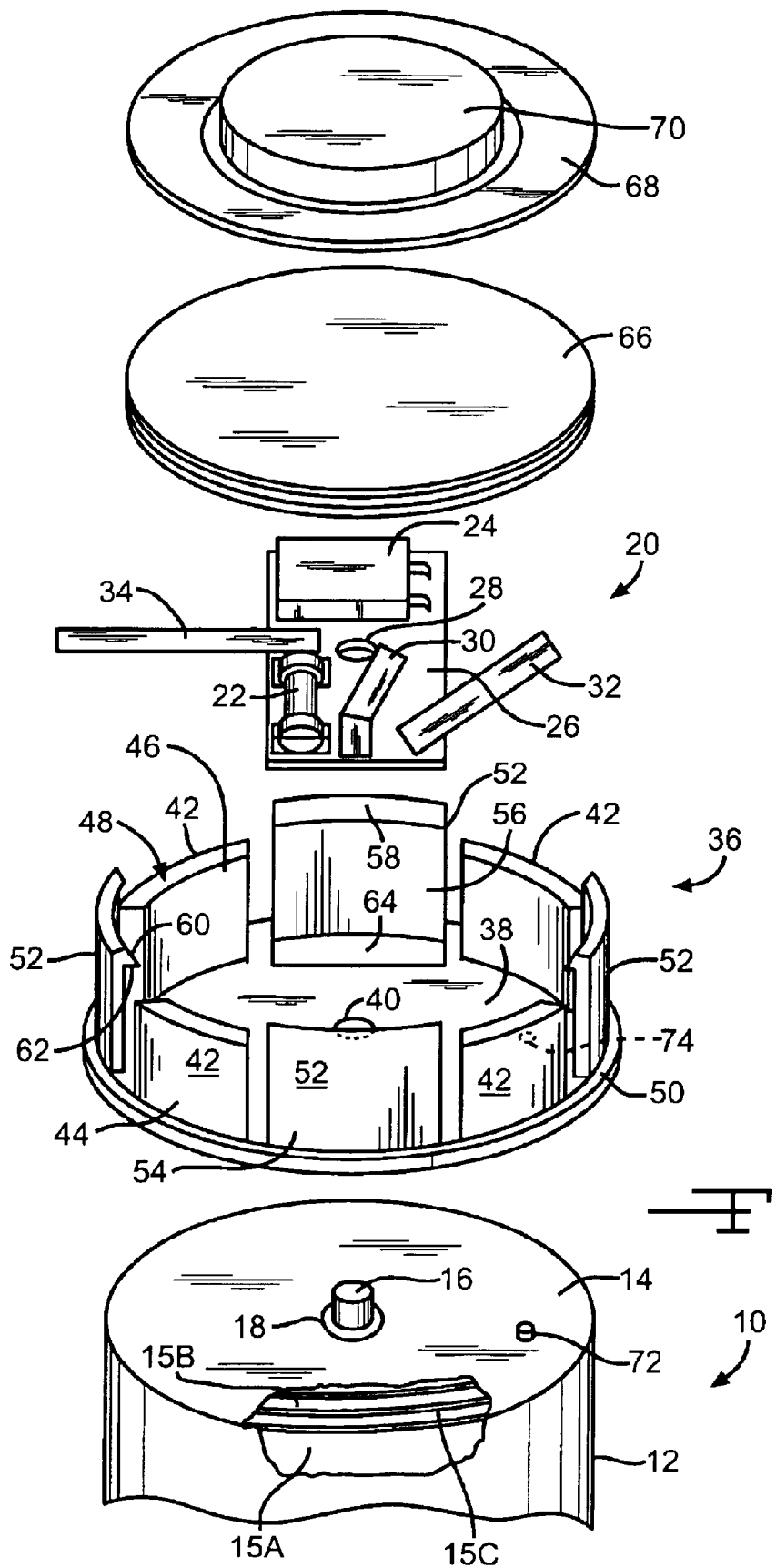
FIG. 1 is an exploded view of a protective housing 36 including a terminal cap 68 mounted on a cell 10.

Referring now to the drawings, FIG. 1 is an exploded view of an electrochemical cell 10 comprising a casing 12 closed by a lid or header 14 to house the electrochemical components therein. The cell comprises an anode active material 15A and a cathode active material 15B segregated from each other by a separator 15C and activated with an electrolyte (not shown). The cell is not intended to be limited to any particular chemistry, and can comprise a solid anode/solid cathode type or a solid anode/liquid depolarizer type. The cell can be of either a primary or a secondary chemistry. Exemplary chemistries include lithium/iodine, lithium/silver vanadium oxide, Li-ion cells, and the like.

In any event, the cell is typically built in a case-negative configuration having the anode electrically connected to the casing 12 and header 14 as the negative terminal and the cathode electrically connected to a terminal pin 16. The terminal pin 16 is electrically isolated from the casing 12 and header 14 by an insulating glass 18 forming a glass-to-metal seal. The cell can also be built in a case-positive configuration having the cathode connected to the casing and header and the anode connected to the terminal pin.

A circuit board 20 having any one of a number of electrical components, such as a fuse 22 and diode 24, is mounted on the cell header 14. The exact electrical components and their configuration are not necessarily part of the present invention and depend on the intended application of the cell 10. The present invention is, however, directed to protecting the electrical components of the current board 20 from shock and vibration conditions, and the like, regardless of their exact function and configuration.

The fuse 22 and diode 24 are supported on a substrate 26 of an insulating material. The substrate 26 has an aperture 28 sized to receive the terminal pin 16 when the circuit board 20 is mounted on the cell header. In this position, the terminal pin 16 is connected to a first lead 30 having one of its ends disposed immediately adjacent to the aperture 28 perimeter. That way, when the circuit board 20 is supported on the cell header with the terminal pin 16 extending through the aperture 28, a weld is used to connect the first lead 30 to the terminal pin 16. The other end of the lead 30 is connected to an electrical trace (not shown) embedded in or provided on the substrate 26.

A second lead 32 has its proximal end connected to the substrate 26. The distal end of this lead is for connecting to the cell header serving as the negative terminal for the case-negative cell 10. Similarly, a third lead 34 is provided with its proximal end connected to an electrical trace (not shown) embedded in or provided on the substrate 26. The distal end of this lead is for connecting to a terminal for the terminal pin 16, as will be described in detail hereinafter.

In order to protect the circuit board 20 from damage, for example, if the cell is used to power a downhole tool in an oil well logging or drilling operation, a protective housing 36 is provided. A material that is suitable for the protective housing 36 is a polyamide sold by E. I. du Pont de Nemours and Company under the trademark ZYTELO (Nylon 6/6) 70G33L. Other suitable materials include VICTREX® (PEEK) 450-G manufactured by Victrex USA Inc. of Westchester, Pa., a polyamide-imide available from DSM Engineering Plastic Products, Inc. of Reading, Pa., as TORLON® 4203 PAI, a material marketed under the name KETRON® PEEK 1000 by DSM Engineering Plastic Products, Inc., and a liquid crystal polymer market as ZENITEe by E. I. du Pont de Nemours and Company.

Figure 2:
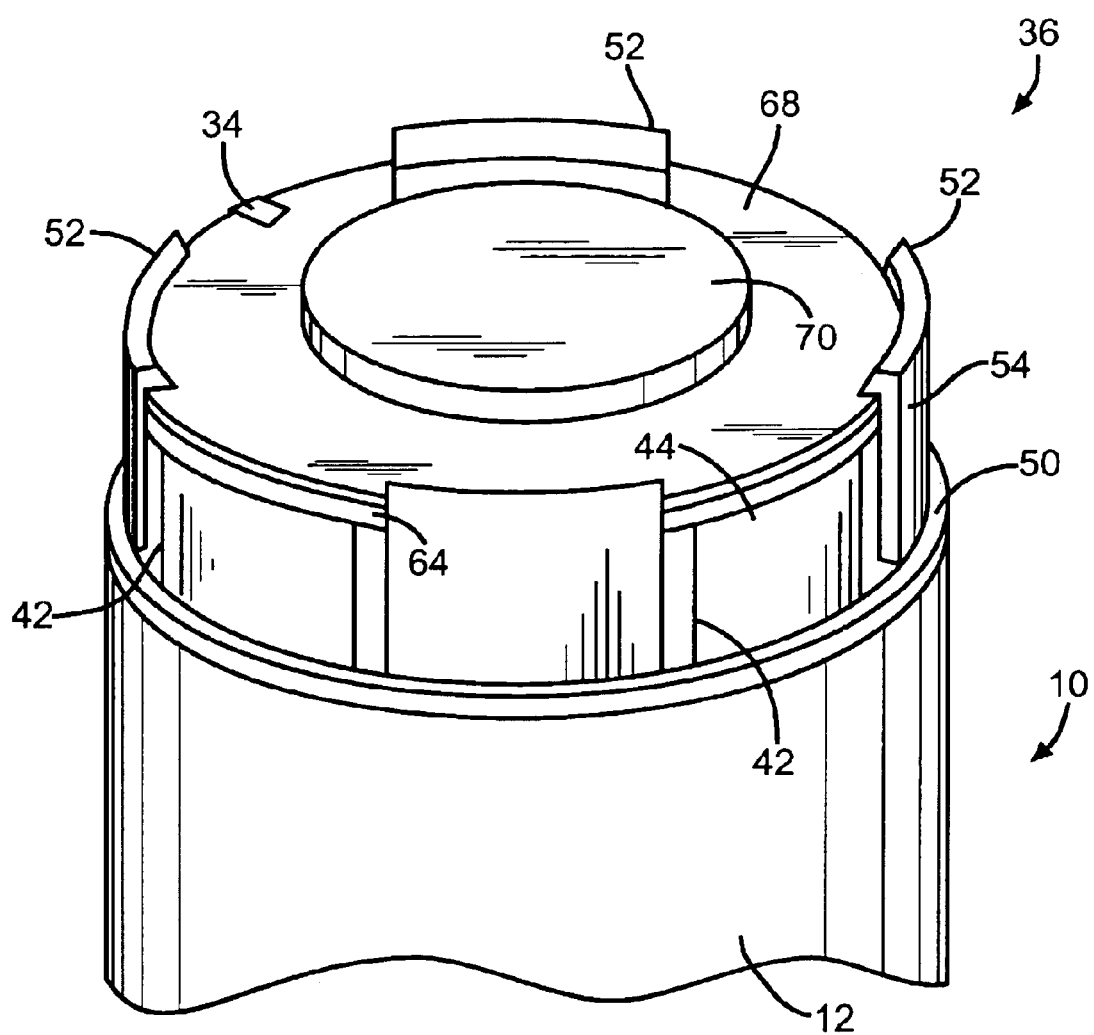
FIG. 2 is a perspective view of the protective housing 36 mounted on the cell casing 12 shown in FIG. 1.

In the embodiment shown in FIGS. 1 and 2, the protective housing 36 has a base 38 of a size and shape that substantially matches that of the cell header 14. Since the exemplary cell is housed in a cylindrical casing 12, the base 38 is circular with a centrally located aperture 40 therethrough. However, it is within the scope of the present invention that the base 38 can have other multi-sided shapes, such as square, rectangular, octagonal, and the like. The shape of the base 38 need not necessarily match that of the cell header.

The base 38 supports a plurality of arcuate projecting shoulders 42 spaced at intervals about the periphery thereof. The projecting shoulders 42 comprise an outer wall 44 and an inner wall 46, both extending upwardly to an upper surface 48. The plane of the upper surface 48 is substantially parallel to the plane of the base 38. The plurality of outer walls 44 are spaced inwardly from the outer periphery of the base 38 to provide a ledge 50, the purpose of which will be described hereinafter.

Upwardly extending retaining clips 52 are supported on the base 38 between each pair of adjacent projecting shoulders 42. The retaining clips 52 comprise an outer wall 54 and an inner wall 56, each wall extending upwardly to an inwardly projecting hook portion 58. The hook portion 58 comprises an angled wall 60 that slopes downwardly and inwardly toward the base aperture 40 to terminate at a planar bottom wall 62. The plane of the bottom wall 62 is substantially parallel to the plane of the base 38 and spaced above the upper planar surfaces 48 of the projecting shoulders 42. The junction where the angled wall 60 meets the bottom wall 62 of each retaining clip 52 is spaced somewhat outwardly toward the base perimeter in relation to the inner wall 46 of the projecting shoulders 42. The plurality of outer walls 44, 54 of the respective projecting shoulders 42 and retaining clips 52 are substantially at an equal radius from the base aperture 40.

To facilitate manufacturing the retaining clips 52, for example by injection molding, molding orifices 64 are preferably provided in the base 38. The molding orifices 64 allow a portion of a mold to extend through the base 38 to form the bottom wall 62 of the retaining clips 52. Once the retaining clips 52 are formed, the mold is withdrawn through the molding orifices 64.

The protective housing 36 is mounted on the cell header 14 with the terminal pin 16 received in the base aperture 40. The circuit board 20 is supported on the base 38 of the housing 36 with the terminal pin received in the aperture 28 thereof.

A compressible pad 66 and terminal cap 68 complete the protective housing. The compressible pad is preferably a silicone-based material capable of withstanding temperatures up to at least about 200° C. A silicone based material suitable for the compressible pad 66 is available from Furon Company of New Haven, Conn. as product number R10470 and referred to by the trademark COHRLASTIC®.

The pad 66 is sized to fit snuggly inside the inner wall 46 of the projecting shoulders 42 with a thickness from the upper surface of the circuit board 20 to the retaining clips 52. The terminal cap 68 is shaped to match the shape of the inner walls 56 of the retaining clips 52. The outer peripheral edge of the terminal cap 68 is sized to extend beyond the inner walls 46 of the projecting shoulders 42 to contact the inner walls 56 of the retaining clips 52 in a close-fitting, releasable relationship.

After the compressible pad 66 is positioned inside the protective housing 36 resting on the circuit board 20, the terminal cap 68 is inserted into the protective housing 36 over the pad to rest on the upper surface 48 of the projecting shoulders 42. Since the retaining clips 52 are of a resilient material, they flex backwardly enough to accommodate this movement, and then snap back into their original position to capture the terminal cap 68 confined between the projecting shoulders 42 and the retaining clips 52. The terminal cap 68 can be removed without damage to the protective housing 36, if necessary.

The terminal cap 68 is preferably of a conductive material, such as stainless steel or nickel, and includes an upwardly projecting boss 70. The previously described third lead 34 from the circuit board is bent to curl up and over the top of the terminal cap 68 and welded, soldered, or otherwise secured thereto. This electrically connects the terminal cap 68 to the cell's terminal pin As shown in FIG. 1, the cell header 14 is provided with a projection 72 spaced from the terminal pin 16. The projection 72 is received in a second aperture 74 (shown in dashed lines) in the base 38 of the protective housing 36. This further prevents rotational movement of the protective housing 36 relative to the cell 10 and header 14. Furthermore, a thin NOMEX® disc (not shown) with double sided high temperature adhesive may be used to secure the protective housing 36 to the header 14.

FIG. 2 is a perspective view of the protective housing 36 including the terminal cap 68 mounted on the cell header 14. As shown, the outer peripheral edge of the base 38 of the protective housing 36 is substantially equal to the size of the cell header 14. The ledge 50 formed between the plurality of outer walls 44, 54 of the respective projecting shoulders 42 and the retaining clips 52 provides a structure for securing the protective housing 36 to the cell 10. While not shown in the drawings, a cylindrically shaped piece of shrink-wrap polymeric material is positioned over the casing sidewall to extend upwardly beyond the ledge 50. The shrink-wrap is then heated, such as by a hot-air gun. This causes the shrink-wrap material to become semi-liquid and then shrink down onto the cell and protective housing, lying over the ledge 50 as it cools. In this position, the deformed shrink wrap locks the protective housing 36 down onto the cell header 14.

It is a primary aspect of the present invention to standardize the shape of the protective housing 36, compressible pad 66, terminal cap 68 and circuit board 20. That way, the same size parts can be used regardless of the size of the cell. For example, while FIG. 2 shows a cell 10 that has substantially the same peripheral size as the protective housing 36, that is not necessary. FIGS. 3 and 4 show a cell 10A comprising a cylindrical casing 12A having a peripheral size substantially larger than the periphery of the protective housing 36. In these figures, the circuit board, compressible pad, terminal cap, and projecting shoulders of the protective housing 36 are not shown for the sake of simplicity. The cell 10A can be of a similar or different chemistry as the cell 10 shown in FIGS. 1 and 2.

Figure 5A:
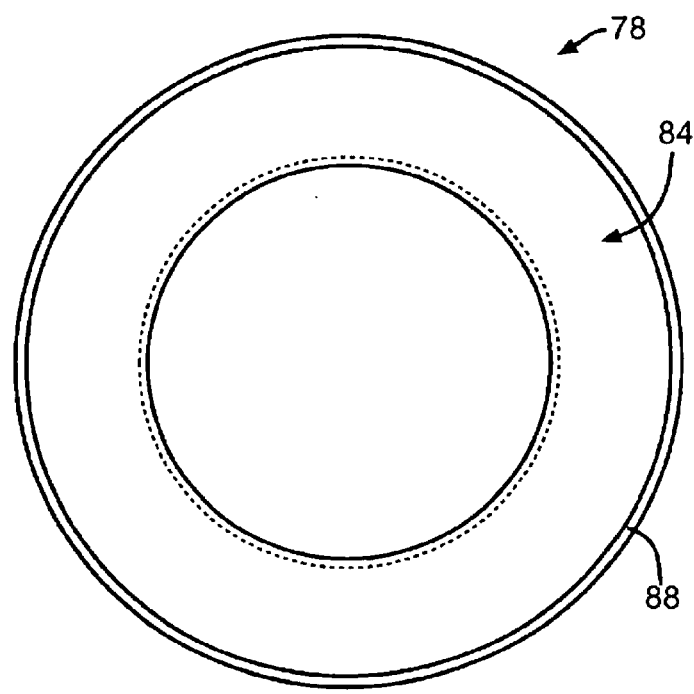
FIG. 5A is a top plan view of the spacer ring 78 shown in FIGS. 3 and 4.
Figure 5B:
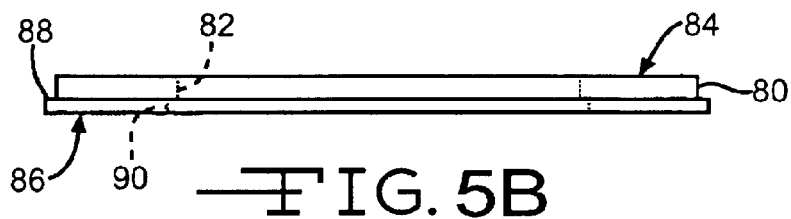
FIG. 5B is a side elevational view of the spacer ring 78.
Figure 5C:
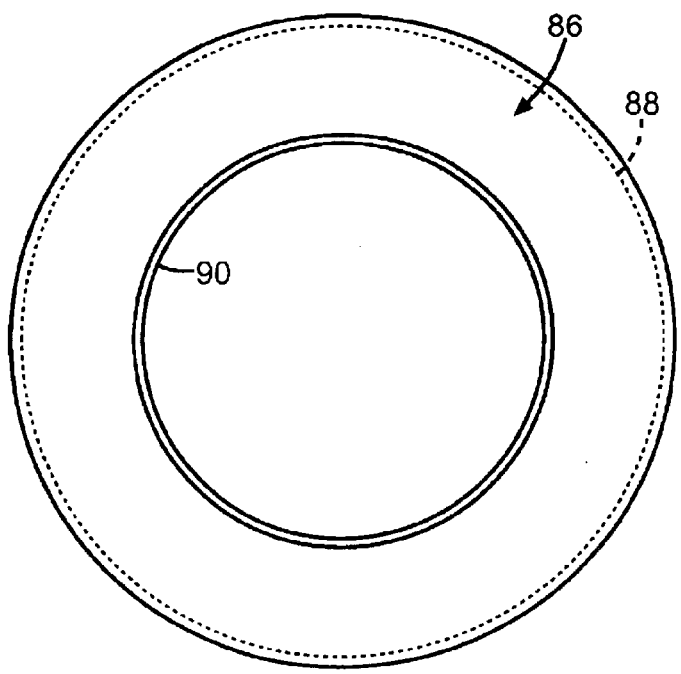
FIG. 5C is a bottom plan view of the spacer ring 78.

In order to secure the undersized protective housing 36 to the header 14A for cell 10A, a spacer 78 is provided. As shown in FIGS. 5A to 5C, the spacer 78 is generally a ring shaped member having a circular outer wall 80 and a circular inner wall 82. The coaxial outer and inner walls 80, 82 extend to a planar upper surface 84. The junction of the outer wall 80 and a lower surface 86 forms a step 88. A ledge 90 is provided at the junction of the inner wall 82 and the planar bottom surface 86. With the protective housing 36 resting on the cell header 14A having the cell terminal pin 16A received in the base aperture 40 of the protective housing 36, the ledge 90 is sized to surround and capture the step 50 of the protective housing. The step 88 of the spacer 78 is disposed adjacent to the periphery of the cell header 14A. Then, when the previously described shrink-wrap polymeric material is heat-shrunk down and onto the spacer 78 and its step 88, the spacer is secured to the cell. The spacer, in turn, helps secure the protective housing 36 to the cell.

Thus, it can be seen that cells of a wide variety of sizes can be provided with a stock protective housing 36, compressible pad 66, terminal cap 68 and circuit board 20. The spacer 78 is provided in a variety of sizes to take up the space between the step 50 of the protective housing 36 and the peripheral edge of the cell. That way, there only needs to be a variety of spacer sizes kept in stock and not a variety of protective housings, compressible pads, terminal caps and circuit boards. This greatly facilitates economy of assembly, as less different sized parts are needed to build cells of different sizes to meet customer requirements.

It is appreciated that various modifications to the inventive concepts described herein may be apparent to those skilled in the art without departing from the spirit and the scope of the present invention defined by the hereinafter appended claims.

What is claimed is:

1. An electrical energy storage device, comprising:
   a) a casing housing an anode and a cathode in electrochemical association with each other;
   b) a protective housing mounted on the casing, wherein the protective housing comprises a base with an aperture therethrough for receiving a terminal pin electrically connected to one of the anode and the cathode, a projecting shoulder extending from the base to a first distance from the base, and a retaining clip extending from the base to a second distance from the base, the second distance being greater than the first distance;
   c) a circuit board supported on the base of the protective housing and comprising a first lead electrically connected to the terminal pin;
   d) a terminal cap captured between the projecting shoulder and the retaining clip to close the protective housing with the circuit board housed therein;
   e) a first ledge provided at a periphery of the protective housing base;
   f) a surrounding member having an inner wall and an outer wall, wherein the inner wall of the surrounding member captures an outer wall of the protective housing; and
   g) a polymeric material securing the outer wall of the surrounding member to the cell casing.

2. The electrical energy storage device of claim 1 wherein there are a plurality of projecting shoulders and a plurality of retaining clips provided about a circumference of the base in an alternating configuration.

3. The electrical energy storage device of claim 1 further comprising a compressible pad intermediate the circuit board and the terminal cap.

4. The electrical energy storage device of claim 3 wherein the compressible pad is a silicone-based material.

5. The electrical energy storage device of claim 1 wherein the surrounding member is a ring that overlays a first ledge comprising the outer wall of the protective housing.

6. The electrical energy storage device of claim 1 wherein the surrounding member is a ring having a second ledge overlaid by the polymeric material.

7. The electrical energy storage device of claim 6 wherein the polymeric material is an annular member characterized as having been heat-shrunk into contact with the outer wall of the surrounding member and the cell casing.

8. The electrical energy storage device of claim 1 wherein the cell casing has a cylindrical outer wall extending between a bottom wall and an open upper end closed by a header and wherein the polymeric material is in a surrounding contact relationship with at least a portion of the cylindrical outer wall of the casing and a second ledge portion of the surrounding member.

9. The electrical energy storage device of claim 1 wherein the terminal cap is a conductive member and a second lead from the circuit board connects to the terminal cap.

10. The electrochemical energy storage device of claim 1 wherein a third lead from the circuit board is electrically connected to a second cell terminal for the other of the anode and the cathode not electrically connected to the terminal pin.

11. A method for securing a protective housing for a circuit board to a casing of an electrochemical cell, comprising the steps of:
    a) providing the protective housing comprising a base with an aperture therethrough for receiving a terminal pin electrically connected to one of an anode and a cathode in electrochemical association with each other housed inside the casing, a projecting shoulder extending from the base to a first distance from the base, and a retaining clip extending from the base to a second distance from the base, the second distance being greater than the first distance;
    b) supporting the circuit board on the base of the protective housing and electrically connecting a first lead of the circuit board to the terminal pin of the cell;
    c) closing an open end of the protective housing by moving a terminal cap into a position captured between the projecting shoulder and the retaining clip;
    d) determining a distance between the protective housing and an outer wall of the casing;
    e) based on the distance determined from step d, selecting a surrounding member from a group of variously sized surrounding members, wherein the selected surrounding member is sized to capture at least a portion of the protective housing and with the surrounding member having its outer wall adjacent to the casing outer wall; and
    f) securing the outer wall of the surrounding member to the casing with a polymeric material.

12. The method of claim 11 including providing the base having a plurality of projecting shoulders and a plurality of retaining clips disposed about a circumference of the base in an alternating configuration.

13. The method of claim 11 including positioning a compressible pad intermediate the circuit board and the terminal cap.

14. The method of claim 11 wherein the surrounding member is a ring overlaying a first ledge of the protective housing.

15. The method of claim 11 wherein the surrounding member is a ring and including overlaying a second ledge of the ring with the polymeric material.

16. The method of claim 11 wherein the polymeric material is an annular member and heating the polymeric material thereby causing it to shrink down and into securing contact with the outer wall of the surrounding member and the casing outer wall.

17. The method of claim 11 wherein the casing outer wall has a cylindrical shape extending between a bottom wall and an open upper end closed by a header and heating the polymeric material thereby causing it to shrink down and into securing contact with the cylindrical casing outer wall and the outer wall of the surrounding member.

18. The method of claim 11 wherein the terminal cap is a conductive member and connecting a second lead from the circuit board to the terminal cap.

19. The method of claim 11 including electrically connecting a third lead from the circuit board to a second cell terminal for the other of the anode and the cathode not electrically connected to the terminal pin.

20. A method for securing a protective housing for a circuit board to a casing of an electrochemical cell, comprising the steps of:
  a) providing the casing comprising a cylindrical outer wall extending between a bottom wall and an open upper end closed by a header;
  b) providing the protective housing comprising a base having an aperture therethrough for receiving a terminal pin electrically connected to one of an anode and a cathode in electrochemical association with each other housed inside the casing when the protective housing is mounted on the cell header, wherein the protective housing comprises a plurality of projecting shoulders extending from the base to a first distance from the base, and a plurality of retaining clips extending from the base to a second distance from the base, the second distance being greater than the first distance;
  c) supporting the circuit board on the base of the protective housing and electrically connecting a first lead of the circuit board to the terminal pin of the cell;
  d) positioning a compressible pad resting on the circuit board and surrounded by the plurality of projecting shoulders and retaining clips;
  e) closing the protective housing by moving a terminal cap against the compressible pad and into a position captured between the plurality of projecting shoulders and the retaining clips;
  f) electrically connecting a second lead from the circuit board to the terminal cap;
  g) electrically connecting a third lead from the circuit board to the other of the anode and the cathode not electrically connected to the terminal pin;
  h) determining a distance between a first outer ledge of the protective housing and the cylindrical outer wall of the casing;
  i) based on the distance determined from step h, selecting a ring-shaped member from a group of variously sized ring-shaped members, wherein the selected ring-shaped member is sized to capture the first outer ledge of the protective housing with the selected ring-shaped member having a second ledge at its outer wall adjacent to the cylindrical casing outer wall;
  j) positioning an annular member of a polymeric material surrounding the second ledge of the selected ring-shaped member and the cylindrical casing outer wall; and
  k) heating the polymeric material and thereby causing it to shrink down and into securing contact with the second ledge of the selected ring-shaped member and the cylindrical casing outer wall.

21. The method of claim 11 including determining the distance between a first outer wall of the protective housing and the casing outer wall before selecting the surrounding member from the group of variously sized surrounding members.

* * * * *